(12) United States Patent
Nagasawa

(10) Patent No.: US 10,536,586 B2
(45) Date of Patent: Jan. 14, 2020

(54) IMAGE PROCESSING APPARATUS CONTROLLING INFORMATION TRANSMISSION, CONTROL METHOD THEREOF, AND RECORDING MEDIUM

(71) Applicant: Konica Minolta, Inc., Tokyo (JP)

(72) Inventor: Kenichi Nagasawa, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 12 days.

(21) Appl. No.: 15/854,025

(22) Filed: Dec. 26, 2017

(65) Prior Publication Data
US 2018/0183950 A1 Jun. 28, 2018

(30) Foreign Application Priority Data
Dec. 27, 2016 (JP) .................. 2016-253586

(51) Int. Cl.
*H04N 1/00* (2006.01)
*G06F 3/12* (2006.01)

(52) U.S. Cl.
CPC ....... *H04N 1/00244* (2013.01); *G06F 3/1206* (2013.01); *G06F 3/1236* (2013.01); *G06F 3/1287* (2013.01); *G06F 3/1288* (2013.01); *H04N 1/00344* (2013.01); *H04N 1/00973* (2013.01); *H04N 2201/001* (2013.01); *H04N 2201/0039* (2013.01); *H04N 2201/0075* (2013.01); *H04N 2201/0094* (2013.01)

(58) Field of Classification Search
CPC .............. G06F 3/1229; G03G 15/5079; H04N 1/00344
See application file for complete search history.

(56) References Cited

U.S. PATENT DOCUMENTS

| 2008/0204780 | A1* | 8/2008 | Katsuhara | H04N 1/60 358/1.9 |
| 2010/0053658 | A1* | 3/2010 | Tamai | H04N 1/00344 358/1.13 |
| 2014/0185084 | A1* | 7/2014 | Cudak | G06F 3/1296 358/1.15 |
| 2014/0268226 | A1* | 9/2014 | Yoshida | G06F 11/0733 358/1.15 |
| 2014/0355051 | A1* | 12/2014 | Nakajima | H04N 1/00344 358/1.15 |
| 2018/0183950 | A1* | 6/2018 | Nagasawa | H04N 1/00244 |

FOREIGN PATENT DOCUMENTS

JP  2005327083 A  * 11/2005
JP  2010-087644 A    4/2010

* cited by examiner

*Primary Examiner* — Nicholas Pachol
(74) *Attorney, Agent, or Firm* — Osha Liang LLP

(57) ABSTRACT

An image processing apparatus that communicates with at least one server includes: a hardware processor that: receives an input of a schedule of maintenance on the server; transmits information to the server; prohibits transmission processing of information to the server during a maintenance period on the basis of the schedule received by the hardware processor; and a storage that stores information indicating prohibition of the transmission processing by the hardware processor, wherein the hardware processor transmits the information stored in the storage to the server after completion of maintenance of the server on the basis of the schedule.

14 Claims, 9 Drawing Sheets

IMAGE PROCESSING APPARATUS CONTROLLING INFORMATION TRANSMISSION, CONTROL METHOD THEREOF, AND RECORDING MEDIUM

CROSS-REFERENCE TO RELATED APPLICATIONS

The entire disclosure of Japanese patent Application No. 2016-253586, filed on Dec. 27, 2016, is incorporated herein by reference in its entirety.

BACKGROUND

Technical Field

The present invention relates to an image processing apparatus, a control method thereof, and a program, and particularly relates to an image processing apparatus related to processing associated with maintenance of a server, a control method thereof, and a program.

Description of the Related Art

Image forming apparatuses such as a copier, a printer, and a multi-functional peripheral (MFP) as a combined apparatus of these are widely used in office environments, or the like, In a case where the MFP uses a function of performing operation in cooperation with a server, for example, a FAX transfer function, the MFP transmits received FAX data to a transfer destination server (FTP server, mail server, or the like). Meanwhile, a server typically needs periodic maintenance, and planned blackouts, or the like, are performed in some cases. Therefore, using the FAX transfer function during a maintenance period of the server operating in cooperation (for example, planned blackout) might cause a transmission error, leading to a failure in FAX transfer.

To cope with this, in a case where transmission of information to a server results in an error, an image forming apparatus disclosed in JP 2010-87644 A performs processing of replacing the server with another mail server or temporarily storing transfer target information in a storage and retrying transfer of the information after recovery of the server.

In the image forming apparatus disclosed in JP 2010-87644 A, however, there is a case, in a maintenance period of a server operating in cooperation, where a portion (FTP unit, for example) that receives transferred information is operating but the other portions are still under maintenance. In this case, transfer of the information might lead to the occurrence of trouble in maintenance processing of the other portions. Moreover, the state where the other portions are in a maintenance period would lead to a failure in processing the transferred information properly in the server operating in cooperation even in a case where the information has been received by a portion that receives the transferred information. Even in that case, an image forming apparatus disclosed in JP 2010-87644 A includes a possibility of performing erroneous determination that the processing was performed normally. Furthermore, the image forming apparatus disclosed in JP 2010-87644 A transmits information to the server even during the maintenance period of the server operating in cooperation, leading to generation of unnecessary error handling.

SUMMARY

One or more embodiments of the present invention provide an image forming apparatus, a control method thereof, and a program for suppressing access to a server operating in cooperation while the server is in a maintenance period.

An image processing apparatus according to one or more embodiments is capable of communicating with at least one server and comprises: a hardware processor that: receives an input of a schedule of maintenance on the server; transmits information to the server; prohibits transmission processing of information to the server during a maintenance period on the basis of the schedule received by the hardware processor; and a storage that stores information indicating prohibition of the transmission processing by the hardware processor, wherein the hardware processor transmits the information stored in the storage to the server after completion of maintenance of the server on the basis of the schedule.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, embodiments of the present invention will be described in detail with reference to the drawings. However, the scope of the invention is not limited to the disclosed embodiments. For same or corresponding portions in figures, same reference signs are used and description thereof will be omitted.

<System Configuration>

Figure 1:
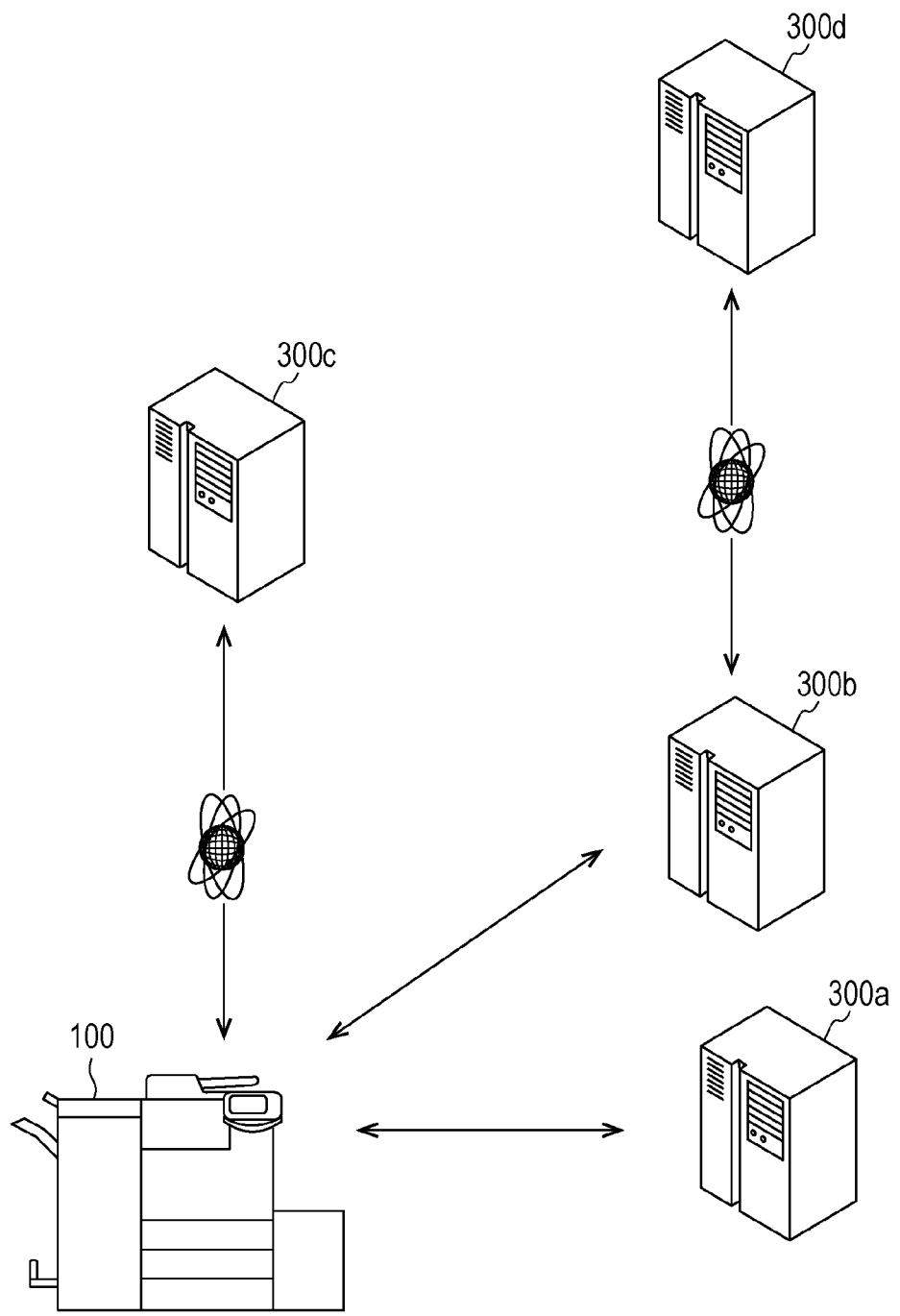
FIG. 1 is a diagram illustrating a specific example of a configuration of an image processing system according to one or more embodiments.

FIG. 1 is a diagram illustrating a specific example of a configuration of an image processing system according to one or more embodiments.

Referring to FIG. 1, the image processing system according to one or more embodiments includes a multi-functional peripheral (MFP) 100 as an image processing apparatus and a plurality of servers.

The image processing apparatus is not limited to the MFP, but may be another apparatus such as a printer, a facsimile transceiver, a copier capable of operating in cooperation with the server. The MFP 100 is an image processing apparatus having these functions in combination.

The plurality of servers is capable of communicably connecting with the MFP 100 and operating in cooperation with the MFP 100. The MFP 100 is capable of achieving various functions by performing operation in cooperation with the server. Specifically, the plurality of servers includes a server 300a as an FTP server connected via a local network, a server 300b as a mail server within a local area, and a server 300c as an external cloud server connected via the Internet, or the like. The server 300b is also connected to a server 300d as an external mail server, via the Internet, or the like. Note that the servers 300a to 300d will also be collectively referred to as a server 300.

The server 300a is an FTP server to be a transfer destination of FAX data received by a FAX transfer function, for example, and stores transferred FAX data. The server 300b is a mail server and transfers data scanned by a scanner function as a mail, for example. The server 300c is a cloud server and can be set as a transfer destination of FAX data received by the FAX transfer function, for example, and stores the transferred FAX data on a cloud. The server 300d is a mail server and transfers a mail transmitted from the server 300b to a terminal within a local area including the server 300d, for example.

The MFP 100 and the servers 300a to 300c are capable of communicating with each other and exchange information. Communication between the MFP 100 and the servers 300a to 300c may take any communication form, regardless of wired communication or wireless communication. The image processing system according to one or more embodiments is assumed to be used in an office environment, and thus, there is an exemplary communication form in which the MFP 100 and the servers 300a to 300c are connected to a wired or wireless local area network (LAN), and information is exchanged via the network.

<Apparatus Configuration>

Figure 2:
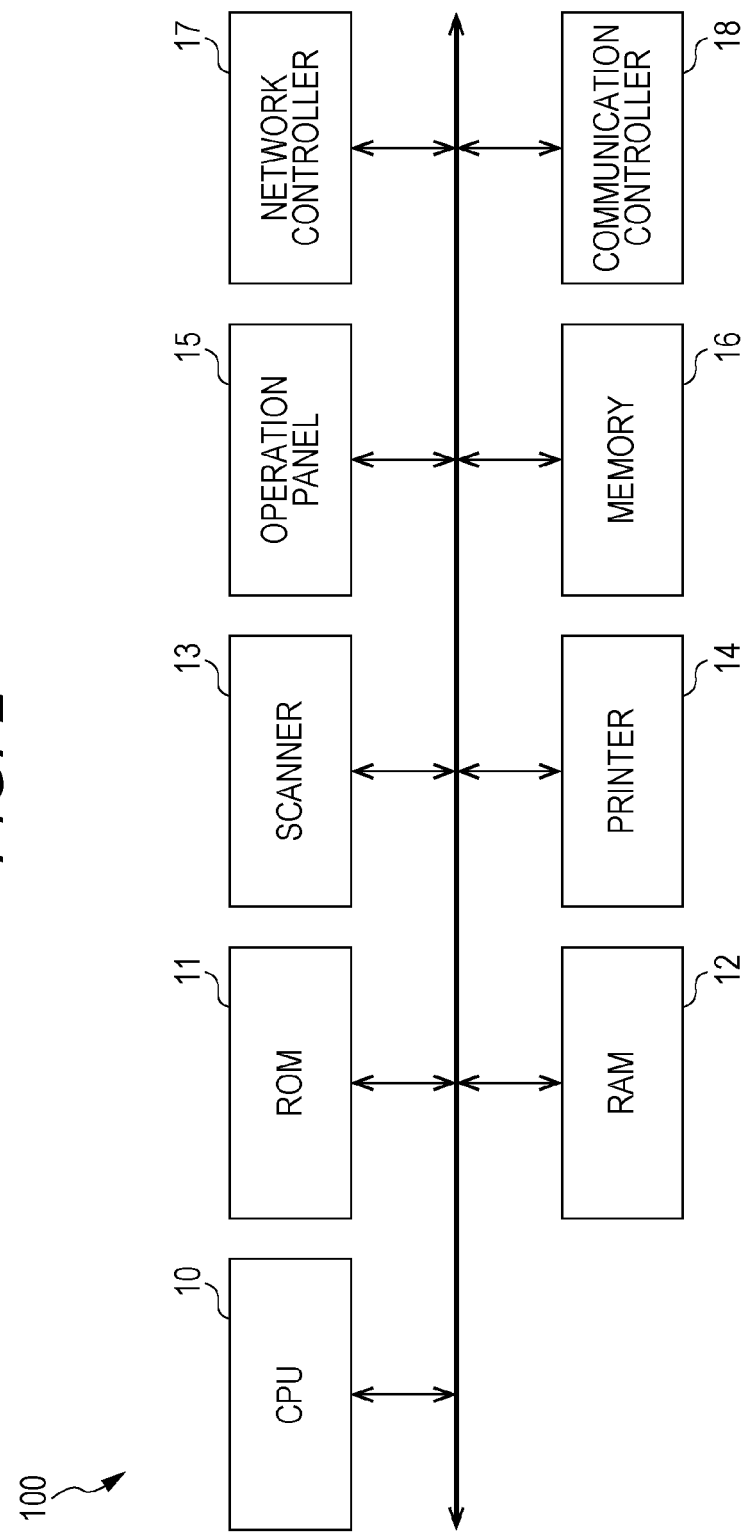
FIG. 2 is a diagram illustrating a specific example of a hardware configuration of an MFP included in an image processing system.

FIG. 2 is a diagram illustrating a specific example of a hardware configuration of the MFP 100.

Referring to FIG. 2, the MFP 100 includes a central processing unit (CPU) 10 as an arithmetic apparatus that controls the whole, a read only memory (ROM) 11 that stores a program executed by the CPU 10, a random access memory (RAM) 12 functioning as a working region in executing a program by the CPU 10, a scanner 13 that optically reads a document mounted on a document table (not illustrated) to obtain image data, a printer 14 that fixes image data on a printing sheet, an operation panel 15 including a touch panel that displays information and receives operation input toward the MFP 100, a memory 16 that stores image data, a network controller 17 that controls communication via the LAN, and a communication controller 18 that controls communication via a telephone line.

The operation panel 15 includes a touch panel and a group of operation keys (not illustrated). A touch panel is configured with a display apparatus such as a liquid crystal display apparatus being overlapped with a position indicating apparatus such as an optical touch panel and a capacitive touch panel, and displays an operation screen, on which an indicated position is designated. The CPU 10 displays the operation screen on the touch panel on the basis of data stored in advance needed to perform screen display.

Functions as the communication controller 18 include, for example, receiving FAX data transmitted by communication via a telephone line, outputting the received FAX data by the printer 14, and transferring the data to the server 300a connected via the network controller 17.

The memory 16 further stores a maintenance schedule of the servers 300a to 300c that work in cooperation (hereinafter also simply referred to as the schedule), and a maintenance schedule of the server 300d connected to the server 300b. Moreover, the memory 16 also stores data (for example, FAX data to be transferred) processed during the maintenance period of the servers 300a to 300c operating in cooperation.

Figure 3:
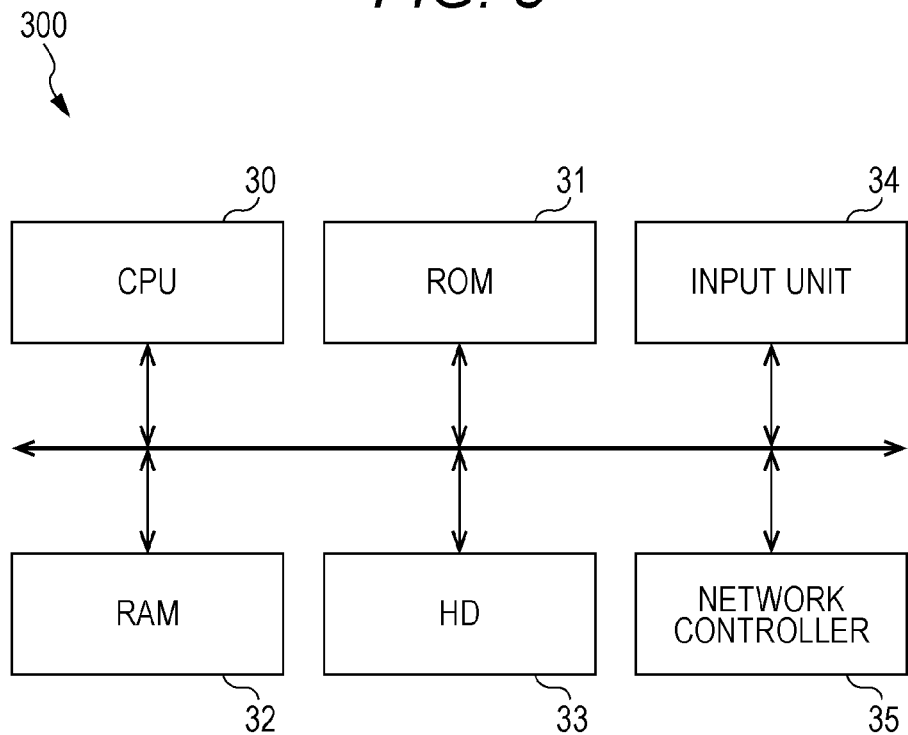
FIG. 3 is a diagram illustrating a specific example of a hardware configuration of a server included in an image processing system.

FIG. 3 is a diagram illustrating a specific example of a hardware configuration of the server 300. Referring to FIG. 3, the server 300 is constituted by a general computer, or the like, as described above, and includes, for example, a CPU 30 as an arithmetic apparatus that controls the whole, a ROM 31 that stores a program executed by the CPU 30, or the like, a RAM 32 functioning as a working region during execution of a program in the CPU 30, an hard disk (HD) 33 that stores MFP information, a schedule, or the like, an input unit 34 that receives an input onto the server 300, and a network controller 35 that controls communication via a LAN.

The HD 33 stores setting information needed for cooperation with the MFP 100 as information related to the MFP 100, and stores a maintenance schedule of the server 300, as a schedule. This setting information may be stored by being input in advance or may be transmitted from the MFP 100 and then stored. The schedule may be stored by being input in advance, or the content (for example, the ending date/time) may be changed according to the maintenance situation.

<Outline of Operation>

Figure 4:
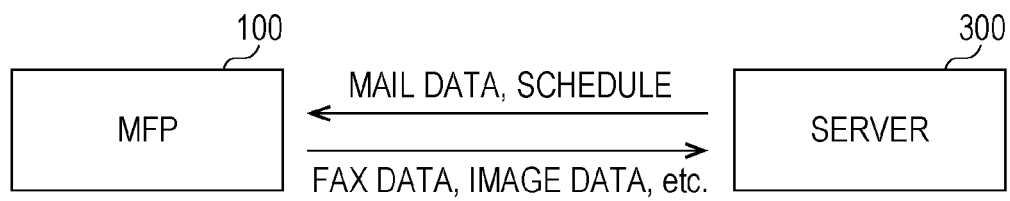
FIG. 4 is a diagram illustrating a flow of information in an image processing system according to one or more embodiments.

FIG. 4 is a diagram illustrating a flow of information in an image processing system according to one or more embodiments.

Referring to FIG. 4, the MFP 100 transmits received FAX data, image data scanned by the scan function, or the like, to the server 300 that operates in cooperation. In addition, the server 300 transmits mail data to the MFP 100 to print the received mail, and transmits a maintenance schedule to the MFP 100.

Figure 5:
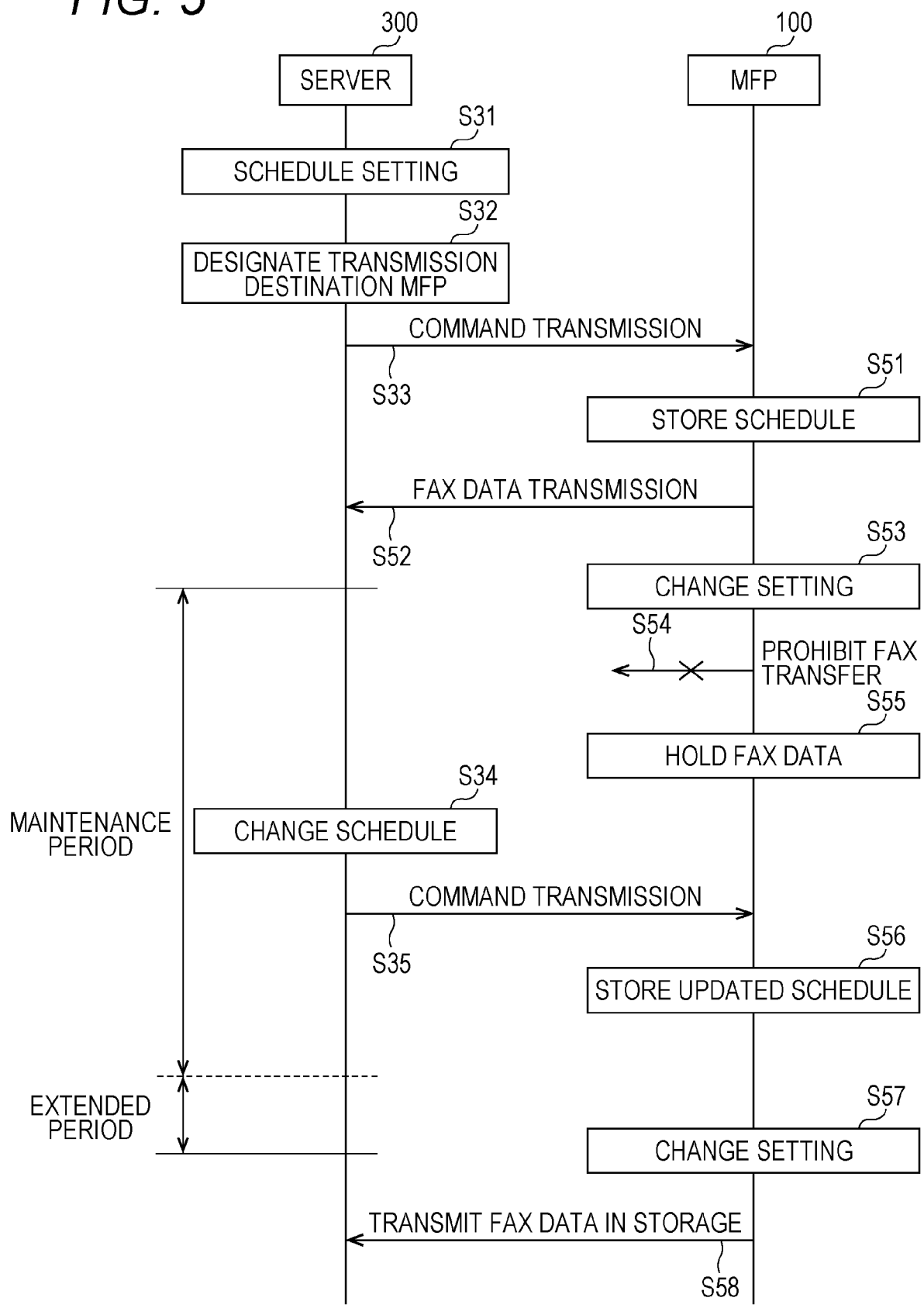
FIG. 5 is a diagram illustrating an operation outline in an image processing system according to one or more embodiments.

Furthermore, operation in the image processing system including the MFP 100 and the server 300 will be specifically described. FIG. 5 is a diagram illustrating an outline of operation in the image processing system. Hereinafter, as the operation outline of the image processing system, operation of prohibiting transfer of FAX data received by the MFP 100 to the server 300a during a maintenance period of the server 300a will be described as an example. Hereinafter, the server 300a will simply be referred to as the server 300.

In a sequence illustrated in FIG. 5, schedule setting is performed by inputting maintenance starting date/time and maintenance ending date/time on the server 300 (step S31), and a transmission destination MFP to which the set schedule is to be transmitted is designated (step S32). In addition to separately transmitting the schedule by designating the transmission destination MFP on the server 300 side, it is allowable to perform broadcast transmission to the apparatus connected to the network controller 35 of the server 300. Moreover, the schedule may be obtained by accessing from the MFP to the server 300, or the schedule may be transmitted from the server 300 as a response to the transmission of a request command from the MFP to the server 300. In the MFP that transmits a request command to the server 300, the function of transmitting the request command functions as an acquisitor that acquires a schedule from the server 300. The schedule set in step S31 is stored in the HD 33 of the server 300.

The server 300 transmits a command including the set schedule to the MFP 100 as the transmission destination MFP designated in step S32. The MFP 100 receives the command transmitted from the server 300, extracts the schedule from the received command, and stores the schedule in the memory 16 (step S51). This enables the MFP 100 to determine whether the server 300 is in the maintenance period on the basis of the schedule stored in the memory 16. In a case where the server 300 is not in the maintenance period, the MFP 100 performs FAX data transmission of transferring the received FAX data to the server 300 (step S52). The server 300 stores the FAX data transferred from the MFP 100 in the HD 33.

Next, the MFP 100 performs setting change of prohibiting FAX data transmission to the server 300 in a case where the maintenance period is started in the server 300 (step S53). In a case where the setting change has been performed, the MFP 100 prohibits transfer of the received FAX data (performs transfer prohibition) to the server 300 (step S54), and holds the received FAX data in the memory 16 (step S55). The MFP 100 adds the processing for which FAX data has been held and FAX transfer has not been performed, to a transfer waiting list. Accordingly, by prohibiting access to the server 300 in the maintenance period of the server 300, the MFP 100 can avoid unnecessary error handling of an error such as a failure in receiving FAX data on the server 300.

Next, in a case where there arises a need to extend the maintenance period of the server 300 during the maintenance period, the server 300 creates a schedule in which ending date/time has been updated and performs schedule change setting (step S34). In a case where the server 300 has changed the schedule, the server 300 transmits a command including the updated schedule (step S35) to the transmission destination MFP designated in step S32. The MFP 100 receives the command transmitted from the server 300, extracts the updated schedule from the received command, and stores it in the memory 16 (step S56). Accordingly, the MFP 100 maintains the setting change prohibiting the transmission of the FAX data by extending the maintenance period of the server 300 on the basis of the updated schedule.

Next, the MFP 100 performs a setting change of permitting transmission of FAX data to the server 300 (step S57) in a case where the ending date/time of the extension period of the maintenance period arrives. In a case where the setting change has been performed, the MFP 100 transmits the FAX data held in the memory 16 to the server 300 on the basis of the transfer waiting list (step S58). The MFP 100 clears the processing for which FAX data held in the memory 16 has been transmitted to the server 300, from the transfer waiting list.

<Functional Configuration>

Figure 6:
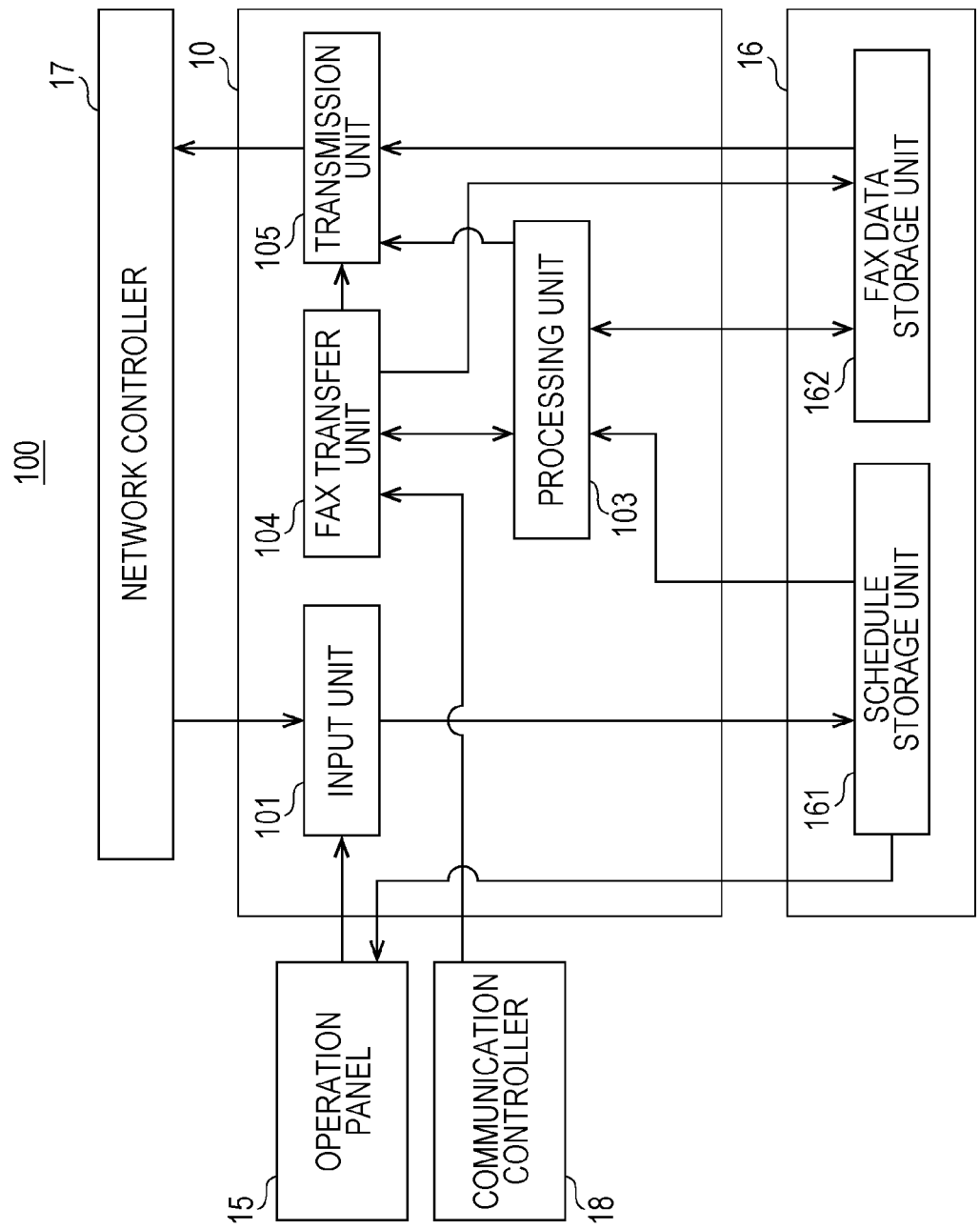
FIG. 6 is a block diagram illustrating a specific example of a functional configuration of an MFP.

FIG. 6 is a block diagram illustrating a specific example of a functional configuration of the MFP 100, provided to achieve the above-described operation. Each of functions illustrated in FIG. 6 is a function formed mainly in the CPU 10 by reading a program stored in the ROM 11 and executing the program on the RAM 12 by the CPU 10. Alternatively, at least a portion of the functions may be formed by the hardware configuration illustrated in FIG. 2.

Referring to FIG. 6, the memory 16 includes a schedule storage unit 161 that stores a schedule and information indicating the updated schedule, and a FAX data storage unit 162 that stores FAX data prohibited to be transferred.

Referring further to FIG. 6, the MFP 100 includes an input unit 101 that receives a command including a schedule from the server 300 via the network controller 17. The input unit 101 extracts a schedule from the received commands and stores the extracted schedule in the schedule storage unit 161. Note that the input unit 101 can also receive a schedule input by the user using the operation panel 15, and the received schedule is stored in the schedule storage unit 161. It is possible to display the schedule stored in the schedule storage unit 161 onto the display unit of the operation panel 15 (for example, a display apparatus such as a liquid crystal display apparatus of a touch panel) by operating the operation panel 15, enabling the user to easily confirm the schedule.

The MFP 100 includes a processing unit 103 that prohibits cooperation during the maintenance period of the server 300 on the basis of the schedule, a FAX transfer unit 104 as one of cooperative functions with the server 300, and a transmission unit 105 that transmits the data to the server 300 via the network controller 17. The FAX transfer unit 104 transfers the FAX data received by the communication controller 18 to the server 300 as FAX data. The transmission unit 105 receives the FAX data from the FAX transfer unit 104 and transmits the FAX data to the server 300 via the network controller 17.

In a case, however, where the processing unit 103 determines that the server 300 is in the maintenance period on the basis of the schedule, the processing unit 103 prohibits the FAX transfer unit 104 from transferring the FAX data, and stores the FAX data in the FAX data storage unit 162. The processing unit 103 adds the prohibited FAX transfer processing to the transfer waiting list. The transfer waiting list is also stored in the FAX data storage unit 162. In a case where the processing unit 103 determines that the maintenance period of the server 300 has ended on the basis of the schedule, the processing unit 103 transmits the FAX data stored in the FAX data storage unit 162 to the server 300 via the transmission unit 105 on the basis of the transfer waiting list.

Figure 7:
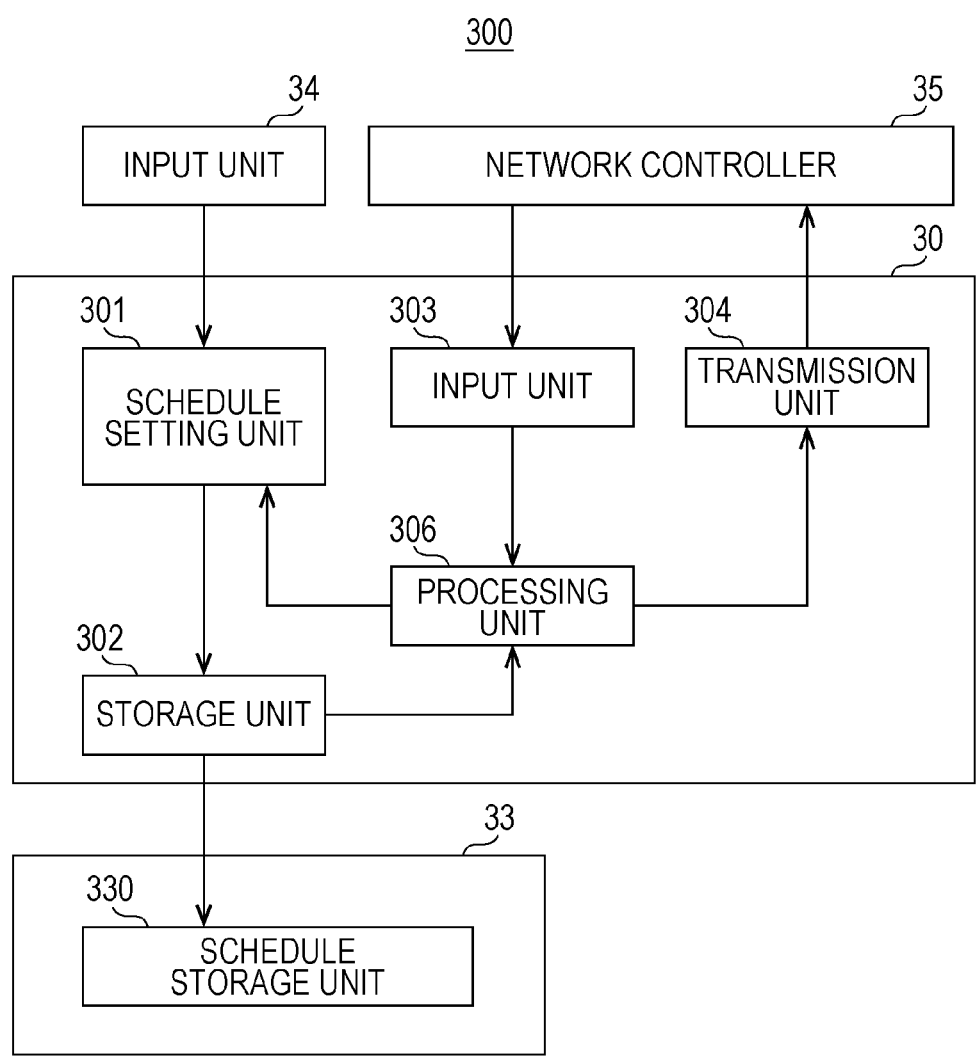
FIG. 7 is a block diagram illustrating a specific example of a functional configuration of a server.

FIG. 7 is a block diagram illustrating a specific example of a functional configuration of the server 300. Each of functions illustrated in FIG. 7 is a function formed mainly in the CPU 30 by reading a program stored in the ROM 31 and executing the program on the RAM 32 by the CPU 30. Alternatively, at least a portion of the functions may be formed by the hardware configuration illustrated in FIG. 3.

Referring to FIG. 7, the HD 33 includes a schedule storage unit 330 as a storage region that stores the maintenance schedule of the server 300. In addition, the HD 33 may include a storage region that stores data transmitted from the MFP and screen data.

Referring further to FIG. 7, as functions provided to achieve the above-described operation, the server 300 includes a schedule setting unit 301 that receives information needed in maintenance schedule setting of the server 300 via the input unit 34 and sets the schedule, and includes a storage unit 302 that stores the schedule. The storage unit 302 stores the stored schedule in the schedule storage unit 330. In a case where the schedule has been updated by the schedule setting unit 301, the storage unit 302 stores the updated schedule and discards the schedule before updating. In contrast, the schedule storage unit 330 stores both the updated schedule and the pre-update schedule being identified from each other. This enables the schedule setting unit 301 to read the schedule set in the past from the schedule storage unit 330 and use the schedule.

The server 300 includes a processing unit 306 that performs processing of transmitting the schedule in the storage unit 302 to a designated transmission destination MFP, and includes a transmission unit 304 that transmits the schedule to the transmission destination MFP designated via the network controller 35. Designation of the transmission destination MFP may be performed toward the MFP predetermined by the processing unit 306, or toward the MFP that has transmitted a request command to the input unit 303 via the network controller 35.

<Operation Flow>

Figure 8:
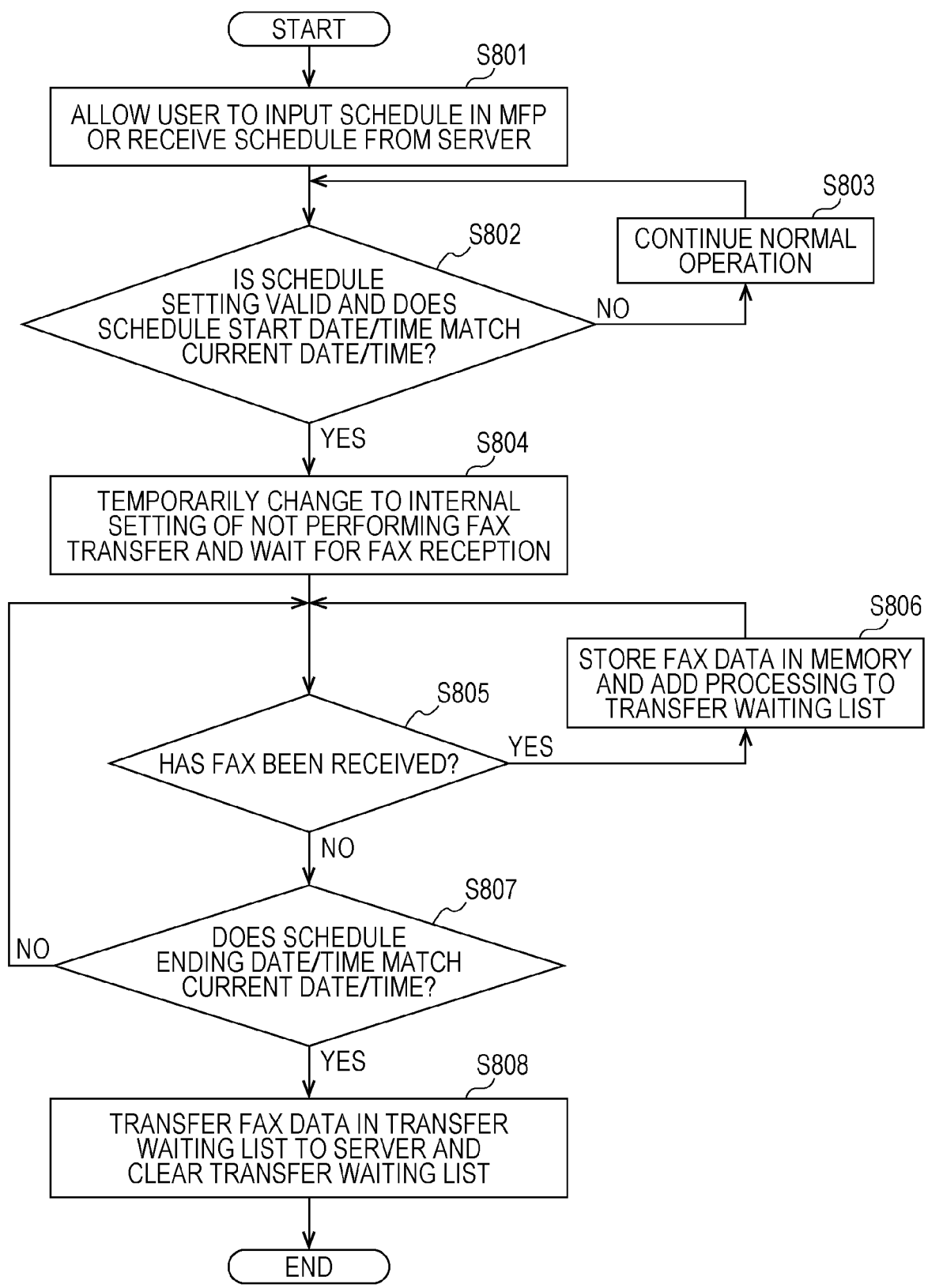
FIG. 8 is a flowchart illustrating a flow of operation in an MFP according to one or more embodiments.

FIG. 8 is a flowchart illustrating a flow of operation in the MFP. The operation illustrated in the flowchart in FIG. 8 is achieved by implementing the functions illustrated in FIG. 6 by reading a program stored in the ROM 11 and executing it on the RAM 12 by the CPU 10.

Figure 9B:
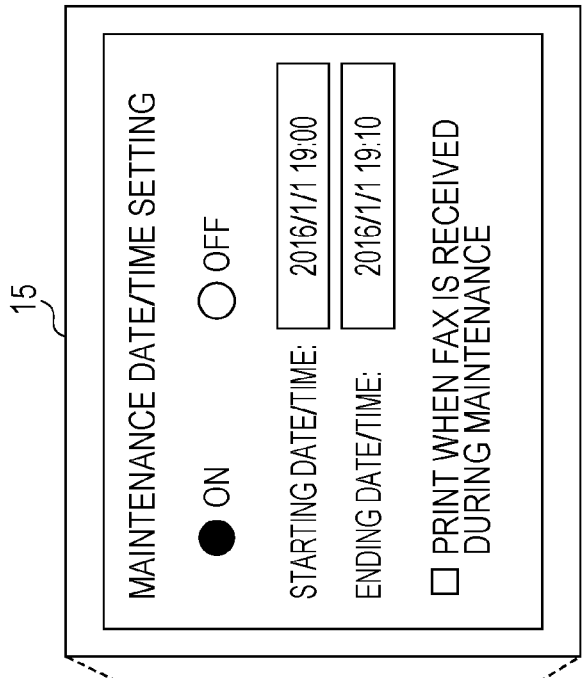
FIGS. 9A and 9B are diagrams illustrating specific examples of display screens.
Figure 9A:
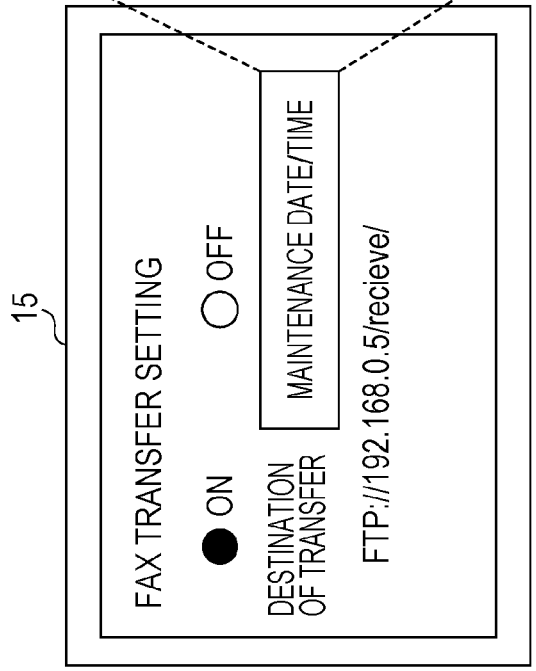

Referring to FIG. 8, the CPU 10 of the MFP 100 allows a user (administrator) to input a maintenance schedule of the server 300 on the operation panel 15 or receives a schedule from the server 300 (step S801). A specific example in which a user (administrator) inputs a maintenance schedule of the server 300 on the operation panel 15 will be described. FIGS. 9A and 9B are diagrams illustrating specific examples of display screens. The operation panel 15 illustrated in FIG. 9A displays a menu screen of FAX transfer setting, specifically displays FAX transfer function "ON-OFF", the address of the transfer destination server 300, and the maintenance date/time. In FIG. 9A, the FAX transfer function is set to "ON", and the address of the transfer destination server 300 is set to "FTP://192.168.0.5/recieve/".

By further selecting the menu of the maintenance date/time, a menu screen for maintenance date/time setting is displayed as illustrated as the operation panel 15 in FIG. 9B. The operation panel 15 illustrated in FIG. 9B displays the schedule setting "ON-OFF", maintenance starting date/time, maintenance ending date/time, and print setting. The schedule setting ON-OFF is a menu on which setting of whether the set schedule is valid or invalid is performed. Specifically, when the schedule setting is "ON", the schedule is valid, and when it is "OFF" the schedule is invalid. The print setting is a setting that, in a case where a print setting check box is checked, the FAX data obtained by FAX reception during the maintenance period is to be printed. With this setting, it is possible to avoid a situation of not noticing reception of an urgent FAX that has been received but not transferred until completion of the maintenance. In FIG. 9B, the maintenance setting is "ON", the starting date/time is set to "2016/1/1 19:00", the ending date/time is to "2016/1/1 19:10", and the print setting is set to "no execution".

The CPU 10 determines whether the setting of the schedule is valid (ON) and whether the starting date/time of the schedule matches the current date/time (step S802). In a case where the setting is invalid, or in a case where the starting date/time of the schedule does not match the current date/time (NO in step S802), the CPU 10 continues normal operation and returns the processing to step S802 (step S803).

In contrast, in a case where the setting is valid and the starting date/time of the schedule matches the current date/time (YES in step S802), the CPU 10 temporarily changes to internal setting of not performing FAX transfer and goes into a FAX reception waiting state (step S804). The CPU 10 determines whether a FAX has been received (step S805). In a case where a FAX has been received (YES in step S805), the CPU 10 holds the FAX data in the memory 16 and adds processing to the transfer waiting list (step S806). After step S806, the CPU 10 returns the processing to step S805.

In contrast, in a case where there is no FAX reception (NO in step S805), the CPU 10 determines whether the ending date/time of the schedule matches the current date/time (step S807). In a case where the ending date/time of the schedule does not match the current date/time (NO in step S807), the CPU 10 returns the processing to step S805. In a case where the ending date/time of the schedule matches the current date/time (YES in step S807), the CPU 10 executes the processing in the transfer waiting list, transfers the FAX data of the processing to the server 300, and clears the processing in the transfer waiting list (step S808).

<Retransmission Flow>

Figure 10:
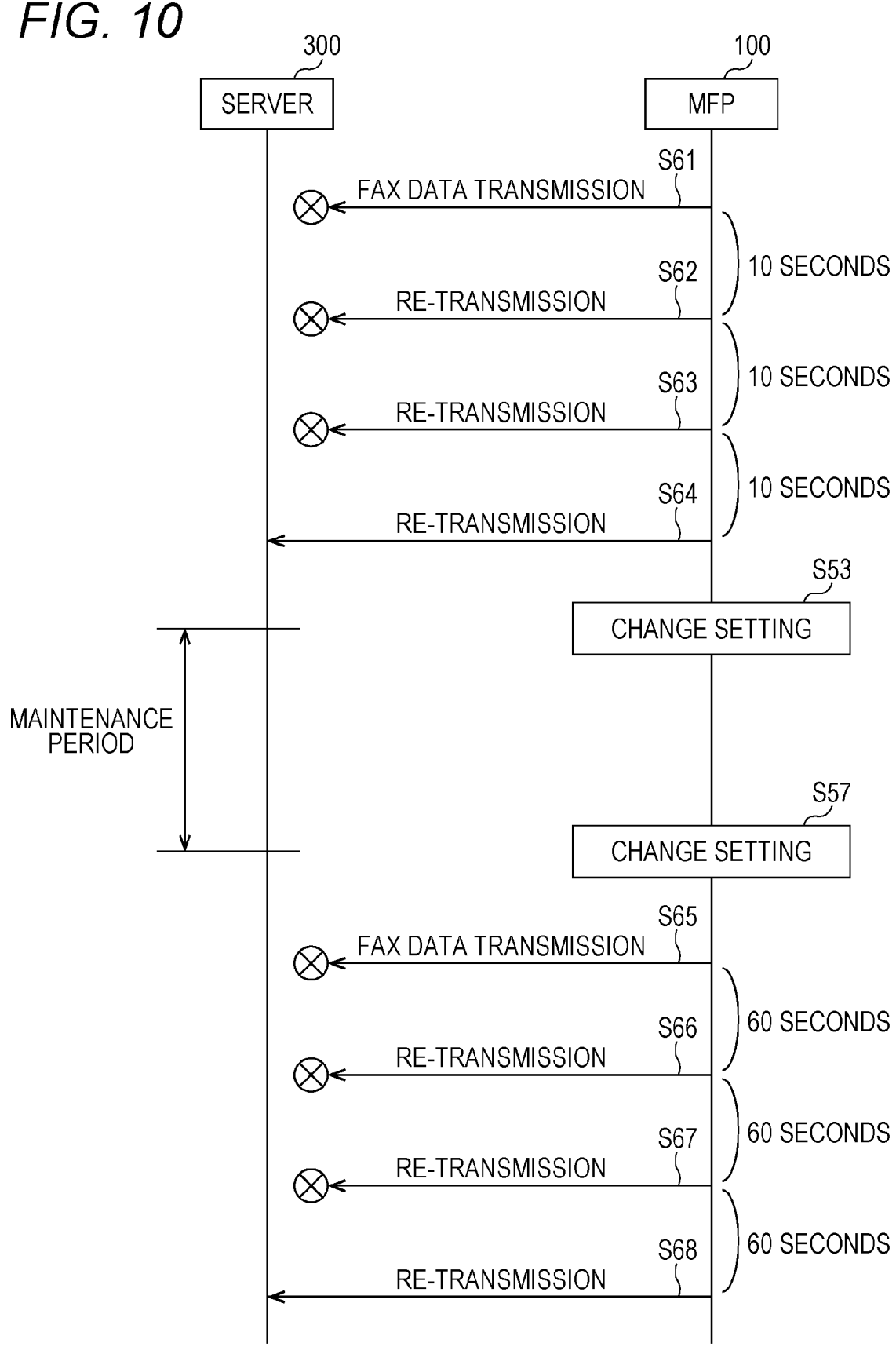
FIG. 10 is a diagram illustrating an outline of re-transmission operation in an image processing system according to one or more embodiments.

FIG. 10 is a diagram illustrating an outline of re-transmission operation in the image processing system. In a sequence illustrated in FIG. 10, the MFP 100 transmits FAX data to the server 300 during normal operation before maintenance is performed in the server 300, and the transmitted FAX data is not received by the server 300, leading to an occurrence of a FAX transfer error (step S61). Whether the FAX data has been received by the server 300 can be determined by the presence or absence of a command (not illustrated) returned from the server 300. For example, in a case where the server 300 does not return a command including a reception conformation within a predetermined time (for example, five seconds) after the MFP 100 transmits the FAX data, this leads to a FAX transfer error.

In the case of a FAX transfer error, the MFP 100 re-transmits the FAX data to the server 300 (steps S62 to S64) at predetermined intervals (for example, 10 seconds). Consequently, the FAX data transmitted by the MFP 100 in step S64 is received by the server 300, and the FAX transfer processing ends.

Next, as described with reference to FIG. 5, processing after steps of maintenance start in the server 300 with setting change to prohibition of FAX transfer MFP 100 (step S53), maintenance completion with setting change to return to the normal operation in the MFP 100 (step S57), will be described. After the maintenance of the server 300 is completed, the MFP 100 transmits the FAX data to the server 300, and the transmitted FAX data is not received by the server 300, leading to an occurrence of a FAX transfer error (step S65). The MFP 100 re-transmits the FAX data to the server 300 (steps S66 to S68) after completion of maintenance of the server 300 at an interval (for example, 60 seconds) that is longer than the interval of re-transmission performed at other times. Meanwhile, the FAX data transmitted by the MFP 100 in Step S68 is received by the server 300, and the FAX transfer processing ends.

Even when the maintenance of the server 300 is determined to have been completed by the MFP 100, there are cases where the maintenance period is extended from the schedule, or the server 300 is during start-up operation after maintenance. In these cases, immediately performing FAX transfer by the MFP 100 after completion of the maintenance of the server 300 might cause repetition of a large amount of re-transmission. To avoid this, as described above, the MFP 100 sets the interval of re-transmission performed after completion of maintenance of the server 300 to an interval (for example, 60 seconds) longer than the interval of re-transmission performed at other times, making it possible to suppress a risk of repeating retransmission.

As described above, the image processing apparatus (MFP 100) according to one or more embodiments is capable of communicating with at least one server 300, making it possible to receive an input of a maintenance schedule on the server 300, as well as transmit information (for example, FAX data) to the server 300. Moreover, the MFP 100 prohibits transmission processing of information to the server 300 during the maintenance period on the basis of the received schedule, and stores the information prohibited to undergo transmission processing in the memory 16. Furthermore, after completion of the maintenance of the server 300 following the schedule, the MFP 100 transmits the information stored in the memory 16 to the server 300. With this configuration, by suppressing access to the server 300 during the maintenance period of the server 300, the MFP 100 can avoid unnecessary error handling.

Moreover, by allowing an input of the schedule to be performed also on the operation panel 15, the MFP 100 can receive the schedule input on the operation panel 15 even in a case where the schedule cannot be obtained from the server 300. Of course, in a case where a command including a schedule is transmitted from the server 300, the MFP 100 can receive the schedule by receiving the command. Moreover, the MFP 100 may obtain the schedule by accessing the server 300, or may obtain the schedule from the server 300 by transmitting a request command of requesting the schedule, to the server 300.

In a case where the schedule of each of the servers is to be obtained from each of the servers, there arises a need to execute same processing by the same number of times as the number of servers, leading to complication of processing. To cope with this, it is allowable to provide a management server that aggregates and manages schedules of individual servers. For example, it is allowable to set the server 300a illustrated in FIG. 1 as the management server, and allow the server 300a to obtain the schedules of the server 300b to the server 300d, so as to be aggregated and managed. Accordingly, simply by obtaining a schedule from the server 300a, the MFP 100 can obtain the schedules of the server 300b to the server 300d.

When the MFP 100 obtained the updated schedule from the server 300, the MFP 100 can change the period for prohibiting the transmission processing of information to the server 300 during the maintenance period on the basis of the updated schedule. For example, as illustrated in FIG. 5, the MFP 100 does not perform setting change of FAX transfer permission at the end of the initial maintenance period, and performs setting change of the FAX transfer permission (step S57) at the end of the extension period.

The MFP 100 prohibits transmission processing of information to the server 300 on the basis of the schedule. There are cases, however, where the server 300 is during start-up operation after transmission of information at the ending date/time of maintenance set by the schedule. To cope with this, it is allowable to allow the server 300 to transmit the information indicating the end of maintenance to the MFP 100 in a case where the maintenance is completed and information reception on the server 300 is enabled. In a case where the MFP 100 receives the maintenance completion information from the server 300, the MFP 100 starts processing of transmitting the information stored in the memory 16 to the server 300.

In a case where the transmitted information has not been received by the server 300, the MFP 100 re-transmits the information to the server 300 at predetermined intervals (for example, 10 seconds). Moreover, the MFP 100 sets the interval of re-transmission after completion of maintenance of the server 300 to an interval (for example, 60 seconds) that is longer than the interval of re-transmission performed at other times.

The MFP 100 may be configured to be able to select processing of information to be stored in the memory 16 during the maintenance period of the server 300. For example, as illustrated in FIG. 9B, it is possible to allow the MFP 100 to perform selection of printing the received FAX without waiting for FAX transfer in a case where the MFP 100 receives the FAX during the maintenance period of the server 300. Moreover, it is possible to allow information to be transmitted to a server other than the server during the maintenance period.

The MFP 100 allows the operation panel 15 to be operated during the maintenance period of the server and allows the schedule information to be displayed on the display unit of the operation panel 15 (for example, in a case where the operation panel 15 is a touch panel, allows the schedule information to be displayed on a display apparatus such as a liquid crystal display apparatus of the touch panel).

In a case where the server 300 operating in cooperation with the MFP 100 is the server 300a of the FTP server (refer to FIG. 1), the MFP 100 transmits, for example, the FAX data received in the normal operation to the server 300a. The transmission processing of FAX data to the server 300a during the maintenance period, however, is prohibited on the basis of the schedule. Moreover, in a case where the server 300 operating in cooperation with the MFP 100 is the server 300b as a mail server (refer to FIG. 1), the MFP 100 transmits, for example, the data scanned by the scanner function in the normal operation to the server 300b. The transmission processing of the scanned data to the server 300b during the maintenance period, however, is prohibited on the basis of the schedule. Furthermore, in a case where the server 300 operating in cooperation with the MFP 100 is the server 300c as the cloud server (refer to FIG. 1), the MFP 100 transmits, for example, the FAX data received in the normal operation to the server 300c. The transmission processing of FAX data to the server 300c during the maintenance period, however, is prohibited on the basis of the schedule.

Note that there is a need to also determine whether the server 300d connected to the server 300b is in the maintenance period in a case where the data scanned by the scanner function is to be transmitted as a mail from the server 300b. Because of this, the MFP 100 may also be configured to be able to obtain a maintenance schedule of the server 300d. The MFP 100 can prohibit the transmission processing of the scanned data to the server 300b during the maintenance period on the basis of the schedule of the server 300d even when the server 300b is not in the maintenance period. With this configuration, the MFP 100 can avoid a case where error handling is generated because of a failure in receiving the data by the server 300d due to the maintenance period in a case where scanned data is to be transmitted as a mail via the server 300d.

<Modification>

(1) The above-described embodiments, or the like, are cases of setting the schedule by setting the starting date/time and the ending date/time. The present invention, however, is not limited to this, and the schedule setting may be otherwise, namely other than the setting the starting date/time and the ending date/time. For example, the schedule setting may be such that 24 hours from the start, 2 o'clock to 4 o'clock on the first Sunday, or the like.

(2) The above-described embodiments, or the like, are cases where that the server 300 stores the set schedule in the storage unit 302. The present invention, however, is not limited to this, and the server 300 may include the schedule storage unit 330 alone without including the storage unit 302.

(3) The above-described embodiments, or the like, are case where the MFP 100 prohibits the FAX transfer unit 104 from performing FAX data transfer in a case where the MFP 100 determines that the server 300 is in the maintenance period on the basis of the schedule. The present invention, however, is not limited to this, and the MFP 100 is only required to be able to prohibit the transmission processing of information to the server 300 and may prepare the FAX data to be transferred by the FAX transfer unit 104 and may prohibit the transmission processing at the transmission unit 105.

Although the embodiments of the present invention have been described and illustrated in detail, the disclosed embodiments are made for purposes of illustration and example only and not limitation. The scope of the present invention should be interpreted by terms of the appended claims. The scope of the present invention is intended to include all modifications within the meaning and scope, which are equivalent to the scope of claims.

What is claimed is:

1. An image processing apparatus that communicates with at least one server, comprising:
    a hardware processor that:
        receives an input of a schedule of maintenance on the server;
        transmits information to the server; and
        prohibits transmitting information to the server during a maintenance period based on the schedule received by the hardware processor; and
    a storage that stores information prohibited from being transmitted to the server during the maintenance period, and
    wherein the hardware processor:
    transmits the stored information that has not been transmitted to the server during the maintenance period, to the server, after completion of maintenance of the server based on the schedule;
    sets the schedule of maintenance to ON or OFF;
    upon setting the schedule of maintenance to OFF, transmits the information to the server even during the maintenance period without referring to the schedule of maintenance; and
    upon setting the schedule of maintenance to ON, prohibits transmitting the information to the server during the maintenance period referring to the schedule of maintenance.

2. The image processing apparatus according to claim 1, further comprising:
    a second hardware processor that executes input being capable of inputting the schedule,
    wherein the hardware processor receives the schedule input by the second hardware processor.

3. The image processing apparatus according to claim 1, wherein the hardware processor receives information including the schedule transmitted from the server.

4. The image processing apparatus according to claim 3, wherein the hardware processor starts transmitting the stored information that has not been transmitted to the server during the maintenance period, to the server, in a case where the hardware processor receives information indicating completion of maintenance from the server.

5. The image processing apparatus according to claim 1, further comprising:
    a second hardware processor that obtains the schedule from the server,
    wherein the hardware processor receives the schedule input by the second hardware processor.

6. The image processing apparatus according to claim 5, wherein the second hardware processor obtains the schedule from a management server that aggregates the schedule from the server.

7. The image processing apparatus according to claim 1, wherein the hardware processor changes a period of prohibiting the transmission processing of the information to the server during the maintenance period based on the schedule that is updated.

8. The image processing apparatus according to claim 1, wherein the hardware processor re-transmits the information to the server at predetermined intervals in a case where the transmitted information has not been received by the server.

9. The image processing apparatus according to claim 8, wherein the hardware processor re-transmits after maintenance of the server with intervals longer than intervals of re-transmission executed at other times.

10. The image processing apparatus according to claim 1, further comprising:
    a second hardware processor that selects processing toward information to be stored in the storage during the maintenance period of the server.

11. The image processing apparatus according to claim 1, further comprising:
    a display that displays information indicating the schedule based on operation during the maintenance period of the server.

12. The image processing apparatus according to claim 1, wherein the server is a cloud server.

13. A method of controlling an image processing apparatus that communicates with at least one server and includes a storage, the method comprising:
    receiving an input of a schedule of maintenance on the server;
    transmitting information to the server;
    prohibiting transmitting information to the server during a maintenance period based on the received schedule;
    storing information prohibited from being transmitted to the server during the maintenance period in the storage;
    transmitting the stored information that has not been transmitted to the server during the maintenance period, to the server, after completion of maintenance of the server based on the schedule;
    setting the schedule of maintenance to ON or OFF;
    upon setting the schedule of maintenance to OFF, transmitting the information to the server even during the maintenance period without referring to the schedule of maintenance; and
    upon setting the schedule of maintenance to ON, prohibiting transmitting the information to the server during the maintenance period referring to the schedule of maintenance.

14. A non-transitory recording medium storing a computer readable program executed by an image processing apparatus that communicates with at least one server and includes a storage, the program causing a processor included in the image processing apparatus to execute:
    receiving an input of a schedule of maintenance on the server;
    transmitting information to the server;
    prohibiting transmitting information to the server during a maintenance period based on the received schedule;
    storing information prohibited from being transmitted to the server during the maintenance period in the storage;
    transmitting the stored information that has not been transmitted to the server during the maintenance period, to the server, after completion of maintenance of the server based on the schedule;

setting the schedule of maintenance to ON or OFF;

upon setting the schedule of maintenance to OFF, transmitting the information to the server even during the maintenance period without referring to the schedule of maintenance; and upon setting the schedule of maintenance to ON, prohibiting transmitting the information to the server during the maintenance period referring to the schedule of maintenance.

* * * * *